US009951820B2

(12) United States Patent
Dowie et al.

(10) Patent No.: US 9,951,820 B2
(45) Date of Patent: Apr. 24, 2018

(54) BEARING WITH WEAR SENSOR

(71) Applicant: NEW HAMPSHIRE BALL BEARING, INC., Peterborough, NH (US)

(72) Inventors: Graham Andrew Dowie, Epsom, NH (US); Brandyn Duane Lewis, Canterbury, NH (US); Richard R. Soelch, Sanbornton, NH (US)

(73) Assignee: NEW HAMPSHIRE BALL BEARINGS, INC., Chatsworth, CA (US)

( * ) Notice: Subject to any disclaimer, the term of this patent is extended or adjusted under 35 U.S.C. 154(b) by 0 days.

(21) Appl. No.: 15/092,697

(22) Filed: Apr. 7, 2016

(65) Prior Publication Data

US 2016/0298691 A1 Oct. 13, 2016

Related U.S. Application Data

(60) Provisional application No. 62/143,937, filed on Apr. 7, 2015.

(51) Int. Cl.
*F16C 41/00* (2006.01)
*G01M 13/04* (2006.01)
(Continued)

(52) U.S. Cl.
CPC .......... *F16C 41/008* (2013.01); *F16C 7/06* (2013.01); *F16C 17/246* (2013.01);
(Continued)

(58) Field of Classification Search
CPC .... F16C 41/008; F16C 41/004; F16C 33/586; G01V 1/30; G01R 15/186
(Continued)

(56) References Cited

U.S. PATENT DOCUMENTS 5,181,975 A 1/1993 Pollack et al.
6,310,581 B1 10/2001 Stockhammer
(Continued)

FOREIGN PATENT DOCUMENTS

DE 102004011237 9/2005
DE 102010045129 3/2012
(Continued)

OTHER PUBLICATIONS

International Search Report and Written Opinion from related PCT Appln. No. PCT/US2016/026326 dated Jun. 24, 2016.

*Primary Examiner* — Melissa Koval
*Assistant Examiner* — Trung Nguyen
(74) *Attorney, Agent, or Firm* — Grossman, Tucker, Perreault & Pfleger, PLLC

(57) ABSTRACT

A bearing with a wear surface sensor configured to wirelessly transmit information comprising a bearing wear surface containing a wear surface sensor wherein the wear surface sensor includes one or more connecting wires for transmitting a data signal from the wear surface sensor indicative of the state of wear of the bearing wear surface. The one or more connecting wires extend outside of the bearing wear surface and are connected to a radio frequency communicator for transmitting a data signal from the sensor indicative of the state of wear of the bearing wear surface. The radio frequency communicator and the sensor are fixed relative to one another such that the connecting wires are not flexed to failure during bearing use.

11 Claims, 10 Drawing Sheets

(51) Int. Cl.
  *F16C 7/06*    (2006.01)
  *F16C 17/24*   (2006.01)
  F16C 9/04      (2006.01)
  F16C 17/02     (2006.01)
  F16C 23/04     (2006.01)

(52) U.S. Cl.
  CPC .............. G01M 13/04 (2013.01); *F16C 9/04* (2013.01); *F16C 17/02* (2013.01); *F16C 23/045* (2013.01); *F16C 2240/60* (2013.01)

(58) Field of Classification Search
  USPC .... 324/71.1–71.2, 755.01, 754.01, 512–537, 324/700, 153–157, 207.13–247, 500
  See application file for complete search history.

(56) References Cited

U.S. PATENT DOCUMENTS

| | | |
|---|---|---|
| 6,429,653 B1 | 8/2002 | Kruspe et al. |
| 6,484,582 B2 | 11/2002 | Ehrfeld et al. |
| 6,535,135 B1 | 3/2003 | French et al. |
| 6,710,593 B2 | 3/2004 | Babin et al. |
| 7,780,357 B2 | 8/2010 | Varonis |
| 7,992,245 B2 | 8/2011 | Schuetz et al. |
| 2002/0054719 A1* | 5/2002 | Takizawa .............. F16C 19/525 384/448 |
| 2002/0186134 A1 | 12/2002 | Rehfus et al. |
| 2005/0010301 A1 | 1/2005 | Disilvestro et al. |
| 2005/0031239 A1* | 2/2005 | Aoki ....................... F16C 33/76 384/448 |
| 2009/0324148 A1 | 12/2009 | Ruggiero et al. |
| 2012/0084930 A1 | 4/2012 | Schuetz et al. |
| 2012/0151768 A1 | 6/2012 | Swadling et al. |
| 2014/0152426 A1 | 6/2014 | Murphy |
| 2014/0152451 A1 | 6/2014 | Murphy |
| 2015/0049970 A1 | 2/2015 | Carnahan et al. |

FOREIGN PATENT DOCUMENTS

| | | | |
|---|---|---|---|
| EP | 2544010 | 1/2013 | |
| FR | 2767818 | 8/2014 | |
| GB | 2406170 | 3/2005 | |
| GB | 002489577 A * | 10/2012 | ............ H01R 39/58 |
| JP | 2006153088 | 6/2006 | |
| JP | 2006329242 | 12/2006 | |
| JP | 2010190651 | 9/2010 | |
| JP | 2013047879 | 3/2013 | |
| WO | 2013/004940 | 1/2013 | |
| WO | 2013/004948 | 1/2013 | |

* cited by examiner

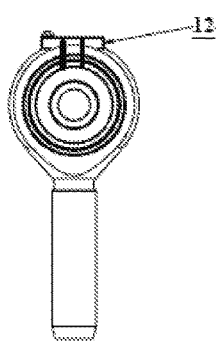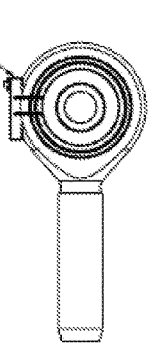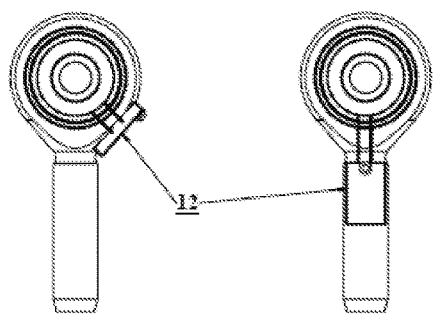
FIG 5A　　　FIG. 5B　　　FIG. 5C　　　FIG. 5D

BEARING WITH WEAR SENSOR

FIELD

The present disclosure is directed at a sensor for a bearing to monitor bearing wear and optionally, other selected parameters associated with bearing use and performance. More specifically, a sensor is now contained within a bearing wear surface and is configured to wirelessly transmit information regarding surface wear and other selected parameters. In particularly, the wear sensor has applications for bearings used in the aviation industry, where continuous monitoring of bearing wear and other characteristics can be important for maintenance and bearing lifetime considerations.

BACKGROUND

Condition Based Maintenance (CBM) is a developing thrust in applications for high performance sliding bearings. It is especially important for aerospace flight critical applications such as but not limited to helicopter rotor pitch link control bearings. Bearing wear rate can be influenced by bearing design, quality, application, and various performance and environmental flight conditions. Therefore it is currently relatively difficult to predict with reasonable certainty any particular bearing's condition based on flight hours alone.

There is also presently an increase in helicopter fly-by-wire, hydraulic, pitch control which has essentially eliminated mechanical rotor haptic feedback to the pilot. These changes have reduced the pilot's ability to judge when there may be a developing pitch control bearing problem due to bearing wear.

An active bearing wear sensor configuration is therefore useful to allow the bearing to more accurately signal when certain benchmarks are identified, such as reduction of bearing wear surfaces to a given threshold or other parameters associated with bearing performance and use. Such a solution to the problem of accurately monitoring bearing performance, and specifically in an aeronautical environment, would also likely reduce the relatively expensive and relatively more unreliable task of mechanical gauging of rotor bearings. Such mechanical gauging inspections typically result in substantial accumulated cost and down time for the aircraft over the life of given bearing placement.

SUMMARY

A bearing with a sensor configured to wirelessly transmit information comprising a bearing wear surface including a wear surface sensor wherein the wear surface sensor includes one or more connecting wires for transmitting a data signal from the wear surface sensor indicative of the state of wear of the bearing wear surface. The one or more connecting wires extend outside of the bearing wear surface and are connected to a radio frequency communicator for transmitting a data signal from said sensor indicative of the state of wear of said bearing wear surface. The radio frequency communicator and the sensor are fixed relative to one another such that the connecting wires are not flexed to failure during bearing use.

BRIEF DESCRIPTION OF THE DRAWINGS

The invention will be described by way of example and with reference to the drawing in which:

FIGS. 5A, 5B, 5C and 5D illustrate examples of preferred placement of the radio frequency communicator.

DETAILED DESCRIPTION

Figure 1:
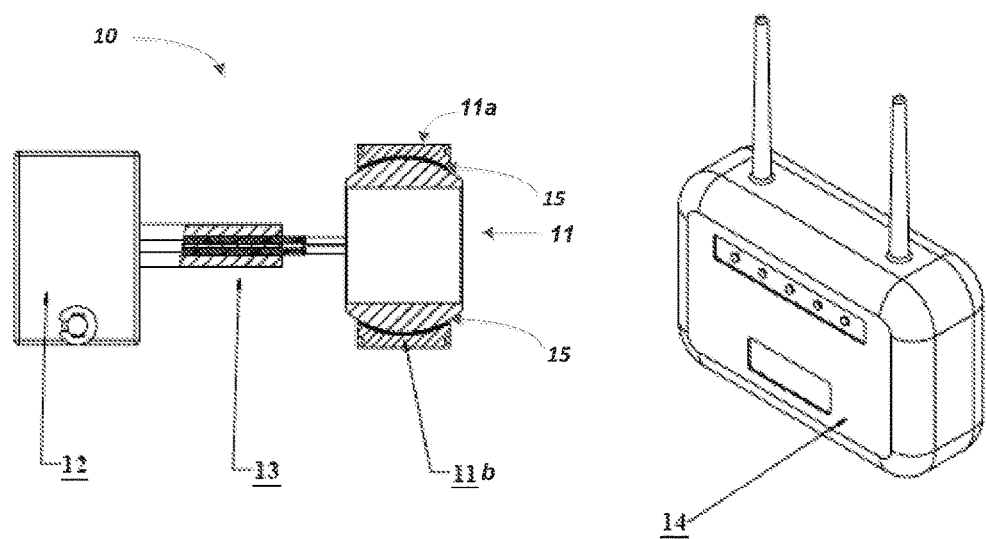
FIG. 1 is a sectional view drawing of the components of one example of the wear sensor including an illustration of a remote reader.

FIG. 1 shows one example of the components of the sensor configuration 10 of the present invention. Preferably, the bearing 11 is a sliding bearing structure wherein one of the sliding bearing surfaces 11a or 11b includes a polymeric wear surface layer 15 containing at least one wear sensor circuit 13a (FIG. 2). As illustrated, the wear sensor 13a includes one or more connecting wires 13 for transmitting a data signal from the wear sensor that are indicative of the state of wear of the sliding bearing surfaces 11a or 11b. The connecting wires 13 therefore extend outside of the bearing wear surfaces 15 and as shown (FIG. 2) are connected to radio frequency communicator 12 for transmitting a data signal from the wear sensor that is indicative of the state of wear of bearing wear surface 15. A remote radio frequency device is shown at 14.

It should be noted that the wear sensor contained within the bearing wear surface and said radio frequency communicator 12 are fixed relative to one another, to ensure that connecting wires 13 do not flex to failure when the bearing is in use. That is, by fixing the wear sensor relative to the radio frequency communicator 12, during bearing use, the connecting wires do not undergo any significant strain which may therefore lead to a break in communication as between the wear sensor and the radio frequency communicator 12. Accordingly, reference to the feature that the wear sensor and the radio frequency communicator as being fixed should be understood herein as that situation where the connecting wires are not flexed to the point of failure during the given lifetime of the bearing and remain relatively intact at least to that point in bearing use whereby the wear sensor has reported that the bearing wear surface 15 is in need of replacement.

It should be noted that preferably, radio frequency communicator 12 is an RFID tag in communication with the wear sensor. The RFID tag 12 can be either active (powered, capable of transmitting with or without receiving a signal from a remote reading device) or passive (unpowered, relies on receiving a signal and energy from a remote reading device). Although exceptions due occur, the active tags are generally preferred in applications requiring higher functionality, greater transmission range or a stronger signal. The passive tags are generally more suitable for identification purposes and close range monitoring.

It is also contemplated herein that the wear sensor circuit 13a may be a printed circuit that is prepared by additive manufacturing or a photo-etched circuit that is formed by subtractive manufacturing.

Figure 2A:
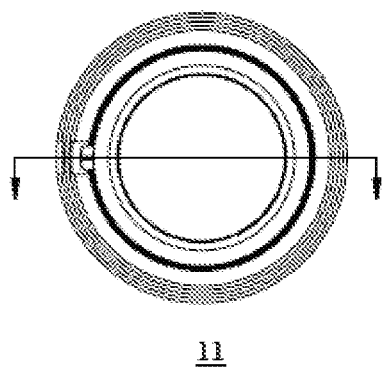
FIG. 2A is a front perspective view of the bearing of FIG. 1.
Figure 2B:
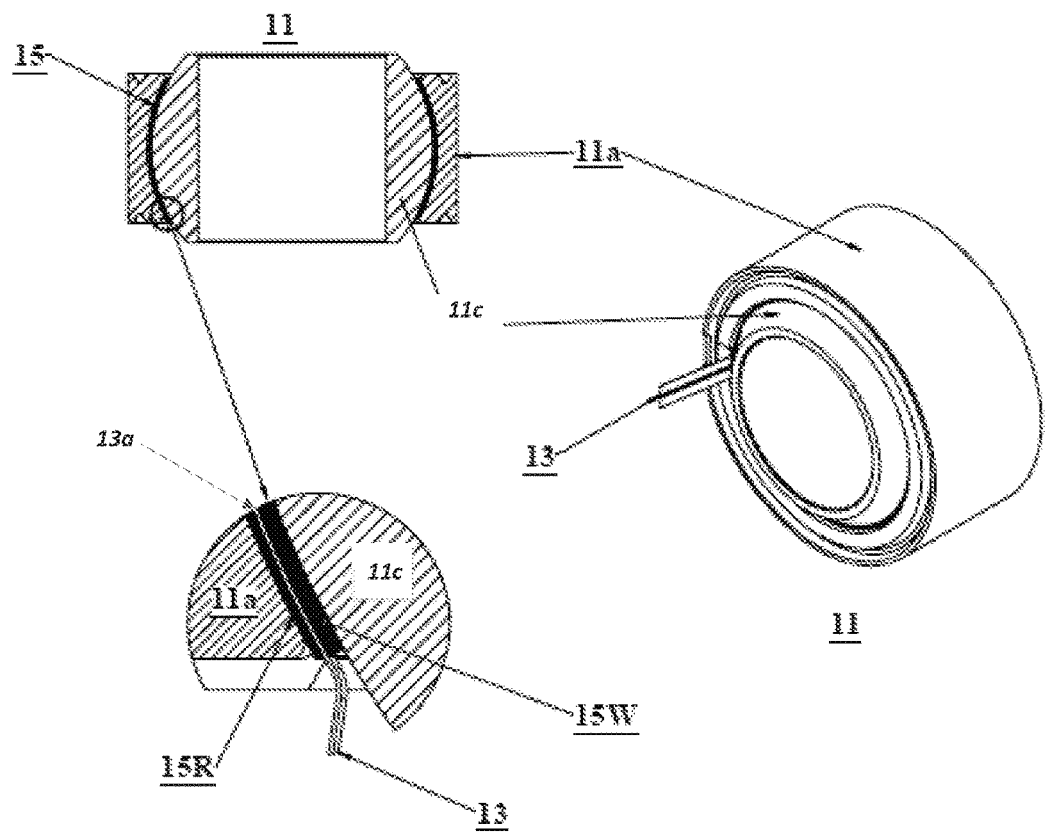
FIG. 2B is a view of the cross-section of the bearing shown in FIG. 2A.

FIG. 2A illustrates a front perspective view of the bearing of FIG. 1. FIG. 2B is a view of the cross-section of the bearing shown in FIG. 2A. The bearing 11 can now be seen with wear surface layer 15, which is preferably a polymeric wear surface (formed from polymer resin). In the expanded view, it can be seen that wear surface 15 contains a wear surface sensor 13a that is preferably sandwiched between wear layers 15R and 15W. Layer 15W is therefore preferably a primary wear surface and layer 15R is then a reserve wear surface. Accordingly, it can be appreciated that the wear surface sensor is contained at least partially within the wear surfaces and is positioned below wear surface 15W and above wear surface 15R. Also, one can see the connecting wires extending from the sensor 13a which as shown in FIG. 1, are ultimately in communication with a radio frequency communicator 12.

It can therefore now be appreciated that the thickness of 15R and 15W can be altered to shift the ratio of normal wear life to reserve wear life, as desired. The ball 11c, in sliding contact with 15W, gradually wears away 15W. The wear sensor 13a generates a signal when the ball wears through wear sensor 13a. This signal is processed by the external wires or preferably RFID tag portion and communicated to the remote radio frequency reading device 14 which may be achieved according to the RFID Tag communications design protocol. The radio frequency reading device notifies the operator the bearing has entered its' reserve life capacity and maintenance should be scheduled.

It should be noted therefore that layer 15W may preferably be of a thickness of 0.002" to 0.020" thick, including all values and increments therein in 0.001" variation. For example, layer 15W may preferably have a thickness in the range of 0.009"-0.012". Layer 15R may have a thickness in the range of 0.001" to 0.10", including all values and increments therein in 0.001" variation. For example, layer 15R may preferably have a thickness in the range of 0.002" to 0.006". Wear sensor 13a may preferably itself have a thickness in the range of 0.001" to 0.010" including all values and increments therein in 0.001" variation. For example, wear sensor 13a may have a thickness of 0.002" to 0.004". Furthermore, the length and width of the wear sensor may vary depending upon the particular bearing at issue. Preferably, the length and width of the sensor is such that it will be present at 5-100% of the entire wear surface area of the bearing wear surface to be monitored Wear surface layers 15R or 15W may preferably be selected from various thermoplastic or thermoset compositions. Preferably, wear surface layers are formed from phenolic based resins, which is reference to those resins that include polymers formed by polymerization of phenolic type compounds. The wear surface layers may also preferably include resins of polyimides and polyacrylates, poly(vinyl formal) resins, polyesteracrylates, poly(amide imides), epoxy, polyetherketones, polyetherether ketones, polyphenylene oxide, polycarbonate, polyphenylene sulfide, polyoxymethylene, polybenzimidazoles, polyethylene, polypropylene and polyurethane acrylates. The polymer resins are therefore preferably present at 20%-100% by weight. The resins may optionally contain 0.1%-80% by weight of fibrous reinforcement which may include woven fabrics or non-woven fabrics formed from aromatic polyamides, polyesters, polyamides, glass and carbon fibers. In addition the polymer resins for the wear surface layers may include 0.1-60% by weight of one or more lubricants selected from polytetrafluoroethylene powder, molybdenum disulfide, hexagonal boron nitride, graphite or perfluropolyethers. Furthermore, wear surface layers 15R and 15W may be the same or have different compositions.

As can be appreciated, in this situation, once the wear sensor 13a informs that wear surface layer 15W has been consumed, were surface layer 15R which may be relatively thinner than wear surface layer 15W, can provide relatively better wear characteristics such that the time for bearing maintenance is assured. For example, for a bearing used in an aviation application, an indication that wear surface layer has been consumed during flight will not necessarily require an immediate grounding of the aircraft.

The opposing, non-polymeric sliding wear surface layer 11c as illustrated in FIG. 2 may be any material or combination of materials: metal, ceramic or polymeric and may have special coatings, processing or other treatments to increase hardness, chemical resistance, frictional properties, surface roughness and the like.

It should be noted that the sensor 13a may optionally provide for other types of information. This may include, but is not limited to, temperature, force, acceleration, or cycles all of which may be communicated with the radio frequency reading device according to a communications design protocol. This information along with a use time record may then constitute a Condition Based Maintenance (CBM) record for the subject bearing within its particular application.

The bearing 11 can be a journal, spherical, rod end, linkage, track roller, flat surface or any shape bearing surface integral to a machine component. The bearing can be metal, composite, polymeric, or ceramic or may be any combination of these. The bearing can also be either an isolated bearing built into housing, a structure, or a discrete component or it may be in a novel link or rod end of the invention.

The wear surface layers 15W or 15R can be adhered to either sliding surface. Typically it is often on the race for spherical and journal bearings and on the roller for track roller bearings although it can be reversed in any case. It is often advantageous to roughen the surface of 11a before combining with the base layer 15R. In some cases it is also advantageous to coat an additional, thin adhesive layer onto 11a before combining with 15R. Such adhesive may be present at a thickness of 0.0001" to 0.0020", more preferably at a thickness of 0.0002" to 0.002".

The polymer wear surface layer can be formed before adhering it to the bearing surface by any polymer sheet, film or composite processing method or combinations of methods. The polymer wear surface layer can be constructed stepwise onto the bearing surface by any polymer, composite, or combinations of these manufacturing processes. The polymer wear surface layer can be partially formed before adhering it to the wear surface layer and then completed after adhering it to the wear surface layer.

In a preferred method conventional processing means are combined as follows: a layer of adhesive resin is coated onto the controlled roughness (Ra) bearing substrate surface (represented as 11a in FIG. 2); next a reserve wear layer (15R in FIG. 2) is placed, coated, molded, sprayed or otherwise formed onto the adhesive coated substrate layer; another layer of adhesive resin is coated onto the top of the reserve wear layer (15R in FIG. 2); then a wear sensor 13a printed circuit is put in place; another coating of adhesive resin is placed on top of the RFID circuit which itself may have a thickness of 0.0001" to 0.020", more preferably 0.001" to 0.004"; and the primary wear surface layer 15W is then placed, coated, molded, sprayed or otherwise formed in place. It is noted that for any of the adhesives utilized herein, for either bonding of the wear surface layers or for bonding of the wear sensor, one can preferably utilize a phenolic based resin system and more preferably a polyvinyl formal resin modified phenolic resin.

The functional circuit 13a can be one or more circuits. The functional circuitry can be formed by any method that results in the layered structure shown in FIG. 2, wherein the sensor circuit 13a is sandwiched between layers 15R and 15W, and thus may be understood as being contained within said polymeric wear surfaces.

Figure 3:
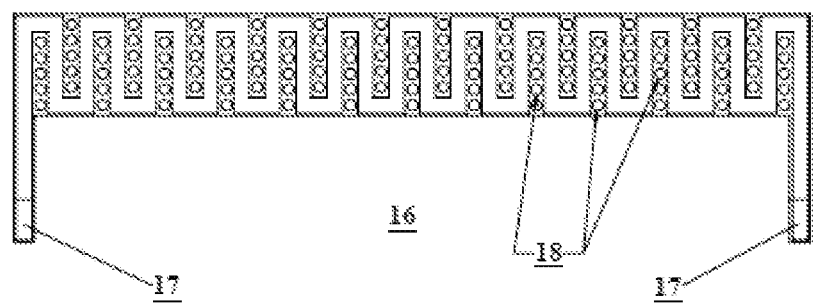
FIG. 3 is an illustration of a printed circuit for a journal bearing.

A preferred wear sensor circuit 13a is a printed circuit. FIG. 3 shows a non-limiting example of a printed circuit 16 for a journal bearing. It has two leads 17 that exit the wear layer to be fixed and connected with the externally mounted RFID tag. The printed circuit has perforations 18, illustrated as holes, to allow interpenetration of the polymer matrix used to adhere to the polymer wear surface layer. It is hypothesized that the perforations enhance interlaminar strength of the composite polymeric wear surface layer 15. The circuit itself can be any conductive metal such as but not limited to copper and silver.

Figure 4:
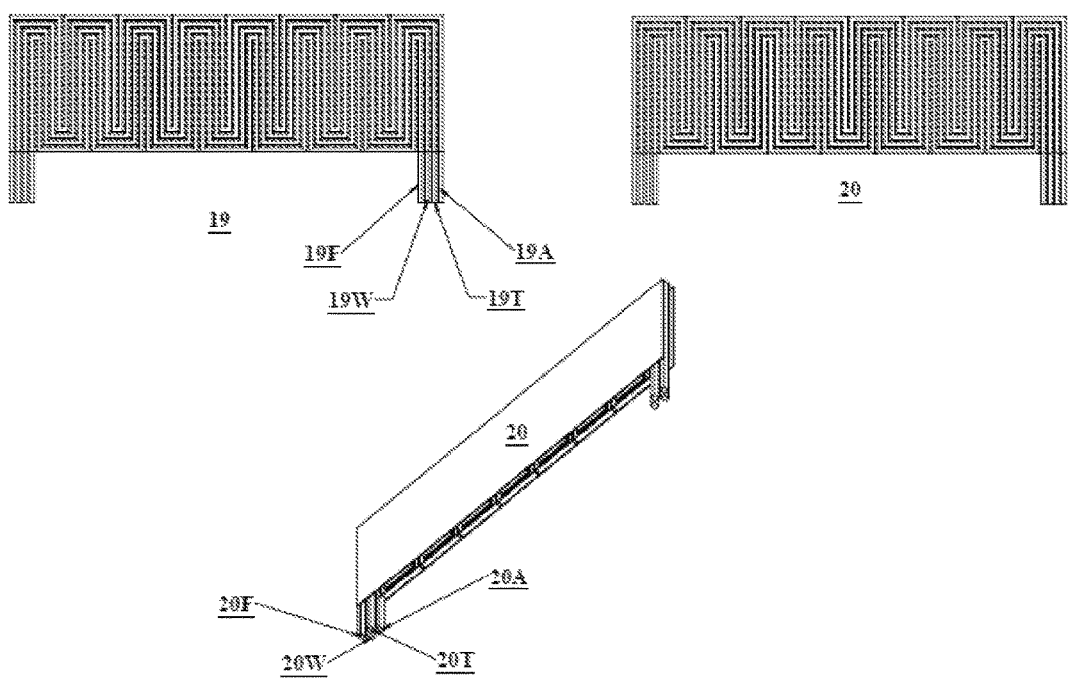
FIG. 4 is an illustration of a printed circuit with four (4) circuits on a side of the printed circuit backing film.

FIG. 4 identifies another non-limiting embodiment of a printed circuit 19 with four circuits on a side of the printed circuit backing film for a journal bearing. Specifically, 19F provides force measurement, 19W provides wear measurement; 19T provides temperature measurement; and 19A provides acceleration measurement. An alternative non-limiting embodiment configuration with two circuits each on the top and bottom surface of the printed circuit backing film is depicted by 20. It is also possible to combine individual circuits on separate printed circuit backing films and build up the multiple sensors in a sandwich-like configuration (not shown). In some cases of force, temperature and acceleration sensor circuits it may be desirable to place the actual sensor portion of the sensor circuit into a pocket or groove in the surface that the wear surface layer is adhered to. In these cases special provisions can be made with the design of the wear surface layer to extend those sensor circuits through the adhered wear surface layer.

FIGS. 5A, 5B, 5C and 5D show examples of preferred placement of the radio frequency communicator 12, which is preferably an RFID tag, on the bearing positioned on the end of a rod. More specifically, rod ends 21, 22 and 23 show that the radio frequency communicator 12 can be mounted anywhere around the rod end body depending upon application requirements. External radio frequency communicator 12 can in some instances also be mounted to the rod end shank as illustrated in rod end 24. It is also contemplated herein that one may place a machined boss on the outside of the bearing housing to accommodate the radio frequency communicator 12. In addition, it is contemplated that the wires 13 extending from the wear sensor contained in the wear surface layers (FIG. 2) can be sealed or encapsulated to further restrict their flexing during bearing operation as well as protect the wires from environmental damage caused by debris, cleaning agents, deicing fluids and the like. Such sealing or encapsulation of the wires may be preferably achieved with a polymeric composition that would again fix the wires and restrict their movement, and may therefore preferably include a thermoset type composition such as an epoxy based coating formulation.

Figure 6:
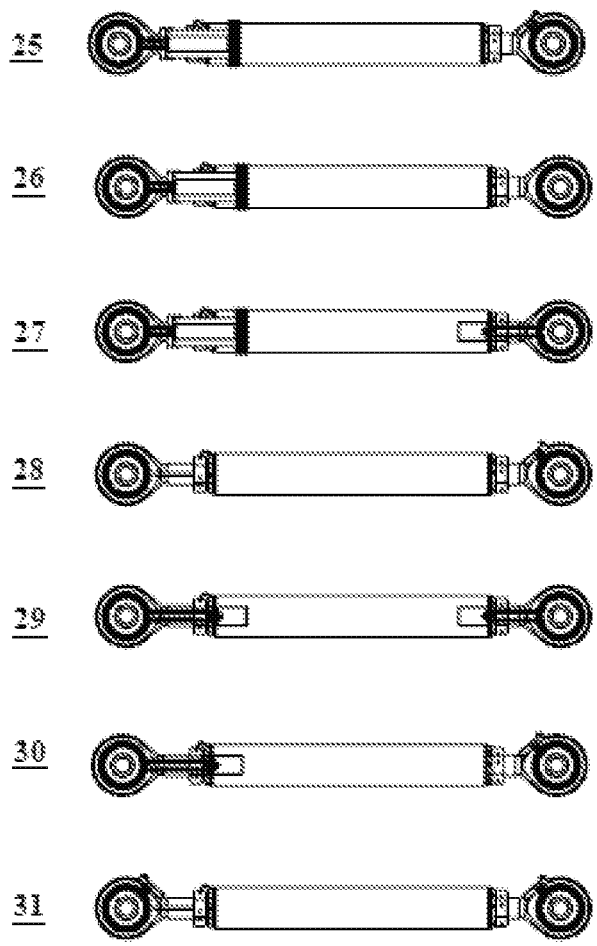
FIG. 6 illustrates other configurations for placement of the wear sensor circuit and radio frequency communicator.

FIG. 6 illustrates other configurations for placement of the wear sensor circuit and radio frequency communicator in accordance with the present invention. Linkages 25, 26, 27 have one length adjustable bearing end that includes a wear sensor contained within a polymer wear surface along with connecting wires extending out of said wear surface that are connected to a radio frequency communicator wherein said radio frequency communicator and said wear sensor are fixed relative to one another such that the connecting wires are not flexed to failure during bearing use.

Linkage 25 also has a second external wear layer RFID mounted portion on the rod end body, while 27 has a second external wear layer RFID mounted portion on the rod end shank. Linkage 26 is an example where only one bearing on the linkage contains the wear sensor of the present invention.

In certain cases a length adjustable linkage could be comprised of two wear sensor circuits that are wired to one radio frequency communicator. Again, the wear sensor circuits would be preferably disposed within the polymeric wear surfaces and include wires extending outside such wear surfaces and connecting to the radio frequency communicator, where the two sets of wires are again fixed relative to the radio frequency communicator and the wires are not flexed to failure during bearing use. Linkages 28, 29, 30, 31 are fixed length adjustable bearing each containing one or more wear sensors with various mounting possibilities for the external radio frequency communicator.

Figure 7A:
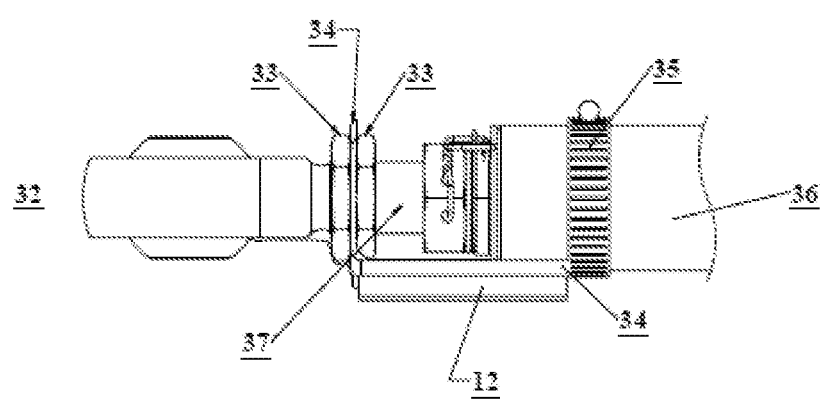
FIGS. 7A and 7B illustrate a length adjustable bearing including a wear sensor.
Figure 7B:
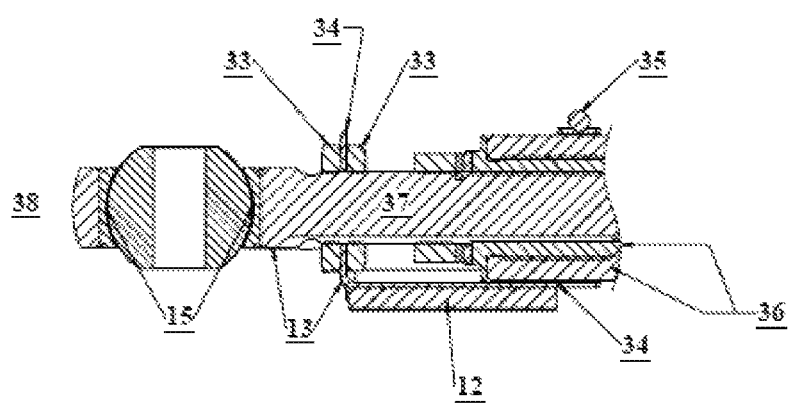
Figure 8:
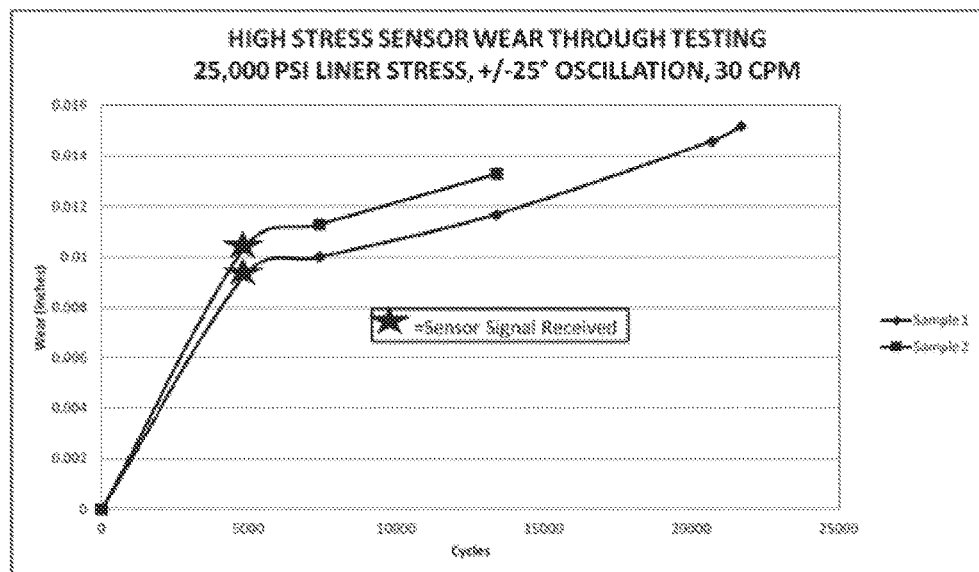
FIG. 8 illustrates that the wear sensor configuration herein exhibits a reduction in wear rate as the bearing wore through the sensor.

FIGS. 7A and 7B illustrate a non-limiting example of a length adjustable bearing that includes a sensor to wirelessly transmit information concerning bearing wear surfaces. Rod end and linkage assembly 32 and cross sectional view 38 shows a non limiting drawing of one embodiment of the adjustable length mounting system. The external radio frequency communicator 12 is attached to bracket 34 and is connected via wires 13 (FIG. 1) with the wear sensor 13a (FIG. 2). Preferably, bracket 34 is attached and fixed to rod end assembly 37 using two jam nuts 33. Bracket 34 may be a metallic bracket, a polymer bracket, or a composite bracket. This configuration allows for adjustment to the overall length of link or linkage assembly 36 independently from rod end assembly 37 with no impact to the ability of wear sensor 13a to communicate via wires 13 to radio frequency communicator 12.

Bracket clamp 35 is a non-limiting example of a retention or stabilization clamp used to secure bracket 34 to link or linkage assembly 36 after adjustment of length. Bracket clamp 35 may restrain bracket 34 directly to the tube or provide close proximity alignment with no contact.

As noted above, the bearing including the wear sensor 13a can be preferably operated to provide information such as but not limited to one or more of the following: identity of the bearing; location of the bearing (in cases with multiple bearings performing a similar function such as but not limited to helicopter pitch rotor bearings); functional status of the RFID Bearing sensor system; indicator when the bearing wear life reserve has started; bearing wear layer temperature record; bearing load cycle count; bearing wear layer force record, and bearing wear layer acceleration data; external bearing wear layer environmental temperature and acceleration.

The bearing containing the wear sensor contained with the bearing wear surfaces herein, along with the use of such wear sensor configuration one length adjustable bearings and rod ends are contemplated to be specifically useful in the field of sliding bearings including but not limited to aerospace bearings, railroad bearings, vehicles suspension systems, and power generation systems such as wind turbines and the like.

It is worth noting that the initial attempt to develop a bearing wear surface indicator herein was made by embedding a wear sensor circuit with radio frequency communicator completely within the wear surface layer. These attempts failed to produce a reliable, detectable signal outside of the bearing. While not being bound by any particular theory, it is believed that the metallic surfaces of the bearing itself may have caused debilitating interference with radio frequency exchange between the tag and the receiver.

Accordingly, the configuration herein, including placement of the wear sensor circuitry within the bearing wear surfaces, along with wire communication outside of the wear surface and to a radio frequency communicator, where the wear sensor circuitry is fixed relative to the radio frequency communicator, such that the wires are not flexed to failure during bearing use, allowed for reliable detection of bearing wear surface lifetime.

EXAMPLE 1

A test was conducted using the following components:
(a) Alien Technology® Higgs 4 inlay EPC Gen2 passive RFID tags
(b) Motorola MC9090 Z handheld RFID tag reader
(c) Plain bearings per AS81934/1 specification, dimensionally conforming to P/N M81934/1-16C016

Test Methods and Findings:
(a) Tags were confirmed to function outside of the wear interface.
(b) Tags were confirmed to function after the liner manufacturing process.
(c) Tags were placed in many orientations, partially and completely within the wear interface of the bearing.
(d) Tags were found to function poorly when in close proximity to metals, especially when metal surfaces obstructed the path between the RFID tag and reader as necessitated by being within the liner.
(e) Tags were found to function poorly when adhered to metal surfaces.
(f) Tags completely within the wear surface layer were unreadable.

EXAMPLE 2

A test procedure was developed to validate the reliable performance of the wear sensor system. This test allowed for rapid iteration until key technical challenges were overcome and the system was ready for conventional bearing life testing. This test was confirmed to provide sufficiently representative wear when compared to established oscillation test procedures.

Components used in Test:
(a) XBee® ZigBee 2.4 GHz wireless transceivers
(b) Bridgeport type milling machine with abrasive cylinder hone
(c) Plain bearings per AS81934/1 specification, dimensionally conforming to P/N M81934/1-16C016 with sensor embedded wear surface layer in accordance with present invention Test Methods:
(a) XBee® transmitter configured to broadcast state of digital input connected to wear sensor.
(b) XBee® receiver configured to indicate state of transmitter digital input and strength of received signal.
(c) Abrasive cylinder hone used to accelerate wear of the bearing liner, simulating bearing functional surface wear.

Findings:
(a) Active transmitter was confirmed to function in close proximity to metal components.
(b) Liner wear reaching limit was reliably detected.
(c) Wear was deemed sufficiently characteristic of application to warrant further development.

EXAMPLE 3

A test was conducted, on a test machine, of the following bearings: (a) Journal bearings in accordance with the present invention, dimensionally conforming to Specification AS81934/1 part number M81934/1-16C016 having a ceramic coated pin as the rotating wear member. Pin surface finish 10-14 Ra.

Test Conditions:
Bearing stress: 25,000 psi
Loading: Unidirectional
Oscillation: ±25° rotation, 100° total per cycle
Frequency: 0.5 Hz
Duration: 0.014-0.020" wear Testing suspended prior to reaching metal to metal surface contact between the pin and journal bearings. As shown in FIG. 9 wear through the sensor system in accordance with the present invention (Samples 1 and 2) exhibits no significant increase in system wear rate and actually slowed after the sensor signal was received which is surprising since the circuit itself is not a material typically used for a sliding bearing wear layer.

What is claimed is:

1. A bearing with a sensor configured to wirelessly transmit information comprising:
at least two sliding bearing surfaces;
a bearing wear surface included on a first of said sliding bearing surfaces wherein said bearing wear surface is located between said first sliding bearing surface and a second of said sliding bearing surfaces and said second sliding bearing surface contacts said bearing wear surface, said bearing wear surface including a wear surface sensor wherein said wear surface sensor includes one or more connecting wires for transmitting a data signal from said wear surface sensor indicative of the state of wear of the bearing wear surface wherein said one or more connecting wires extend outside of said wear surface and are connected to a radio frequency communicator for transmitting a data signal from said sensor indicative of the state of wear of said bearing wear surface;
wherein said radio frequency communicator and said sensor are fixed relative to one another such that said connecting wires are not flexed to failure.

2. The bearing sensor of claim 1 wherein said bearing wear surfaces comprise a first bearing wear layer and a second bearing wear layer and said bearing wear surface sensor is positioned below said first wear layer and above said second wear layer.

3. The bearing sensor of claim 2 wherein said first bearing wear layer has a thickness that is greater than said second bearing wear surface layer.

4. The bearing sensor of claim 2 wherein said first bearing wear layer has a thickness of 0.002" to 0.020".

5. The bearing sensor of claim 2 wherein said second bearing wear layer has a thickness of 0.001" to 0.10".

6. The bearing with a sensor of claim 1 wherein the bearing is a journal bearing, a spherical bearing, a sliding bearing, or a track roller.

7. The bearing of claim 1 wherein said radio frequency communicator is an active RIFD tag with its own power source.

8. The bearing of claim 1 wherein said radio frequency communicator is a passive RFID tag without its own power source.

9. The bearing of claim 1 wherein said bearing wear surface comprises a thermoplastic or thermoset resin.

10. The bearing of claim 1 wherein said bearing is positioned on a rod end that is capable of adjusting its length.

11. The bearing of claim 1, wherein said second sliding bearing surface is a ball.

\* \* \* \* \*